May 28, 1963 R. W. HALL 3,091,154
REFLECTOMETER
Filed Jan. 6, 1961

*INVENTOR.*
RICHARD W. HALL
BY
ATTORNEY

United States Patent Office 3,091,154
Patented May 28, 1963

3,091,154
REFLECTOMETER
Richard W. Hall, New Canaan, Conn., assignor to Barnes Engineering Company, Stamford, Conn., a corporation of Delaware
Filed Jan. 6, 1961, Ser. No. 81,137
4 Claims. (Cl. 88—14)

This invention relates to a reflectometer and particularly a reflectometer which is useful for measuring infrared reflectance.

Reflectometers which measure specular reflection are common instruments and with visible light give satisfactory results. However, serious difficulties are encountered with other optical radiations particularly in the infrared. While the present invention is an instrument that is just as useful in the visible and ultraviolet its advantages are not as great as in the infrared because the problem is less serious. The invention, however, is an optical instrument and as far as the instrument is concerned the wavelength range of radiation used does not change its operation in the slightest.

A common type of reflectometer involves passing the radiation beam through a three mirror path. The beam is reflected from the first face, strikes a plane mirror parallel to the axis of the beam, is reflected back onto the second inclined mirror and thence to the portion of the instrument in which the radiation is measured. In most laboratory instruments this will be in the form of a slit which can be combined as the entrance slit of a monochromator if measurement of different wavelengths is desired. The instrument is nulled for the mirror combination and then the plane mirror is replaced by the sample, the reflectance of which is to be measured.

It will be noted that in the type of reflectometer described above a comparison is made between the reflection from the sample and that of the standard mirror. The accuracy of the instrument is absolutely dependent on the standard mirror used and unless its reflectivity is accurately known instrument readings are without accurate quantitative significance. In the visible light the problem is not serious. Mirrors are available having an extremely high reflectivity and the reflectivity of a mirror in visible light is substantially unchanged by changes in the environment such as temperature. Also, throughout the visible spectrum, which is actually a very narrow band of radiation less than half an octave wide, changes in reflectivity with wavelength are insignificant with good mirrors. In other words, the standard reflectometer, operating as described above, is satisfactory for visible light measurements and such reflectometers have been used with success for a long time.

In the infrared and to a significant but somewhat lesser extent in the ultraviolet an entirely different situation is presented which has rendered ordinary reflectometers of little use for accurate measurements in the infrared particularly the far infrared. The problem is twofold. First, it is an extremely difficult matter to obtain an accurate measure of the reflectivity of any surface in the infrared or ultraviolet and the reflectivity is ordinarily neither as high as obtainable in the visible nor as unchanging with varying environments such as temperature radiation wavelength and the like.

The second problem is even more serious. In the visible light an ordinary surface at ordinary temperatures emits no radiation. Therefore, the only radiation which comes out of the reflectometer system described above is that which is reflected. In other words, theoretically it does not make much difference whether the reference mirror has an extremely high reflectivity or only a moderate one. In each case it represents an accurately determinable reference level. In the infrared and particularly in the far infrared all materials emit radiations even at ordinary room temperature. This is particularly so with the longer wavelength infrared. If it were possible to obtain a perfect infrared mirror no problem would arise but there is no such thing and if there is substantial absorption the mirror will be an emitter of infrared which will vary in amount with temperature and with wavelength. This results in measurements which are inaccurate and sometimes not much better than educated guesses.

The present invention solves the problem of accurate reflectance measurement without having any precise idea of the reflectance of any of the mirrors used in the system. Essentially in the present invention instead of comparing a sample surface with a standard mirror the mirrors remain in the circuit (usually there will be three of them), and the sample is inserted, and the mirrors moved so that the sample forms an additional reflecting surface. The instrument is nulled when there is no sample present or if it is not of the null type output indicators are adjusted to a predetermined reference reading and then the reflection from the sample is introduced. In every case this will result in a lowering of the radiant energy output or a smaller meter or other measuring instrument reading. The mirrors remain in the system and they are not changed. Therefore, it is not necessary to know anything about the nature of the mirrors. Theoretically they could have a five percent reflectance. Of course, in practical instruments some effort is made to use mirrors that have a fairly high reflectivity because the accuracy with which the indicators of the instrument can be read is somewhat greater. However, if it is a matter of complete indifference just what the reflectivity of the mirrors is and it is also in no sense necessary that each mirror have the same reflectivity.

The optical reflecting system which constitutes the present invention may be of various configurations. Of course, the invention has to be used in a complete reflectometer but it is an advantage that the other elements of the reflectometer, such as radiation source, beam forming elements, beam comparison elements, etc. are not changed. The different modifications of the present invention are, however, particularly suitable with different types of instruments and it is an advantage of the present invention that in a preferred though slightly more complex form the present invention can be used in any type of instruments. On the other hand, the more simple form is economical and desirable for use in certain instruments for which it is suited. Since the present invention must be used in a complete instrument, although it may be detachable as an accessory, the invention will be described in conjunction with one typical reflectometer, namely a Beckman spectrophotometer. The invention will also be described in conjunction with the drawings in which:

Figure 1:
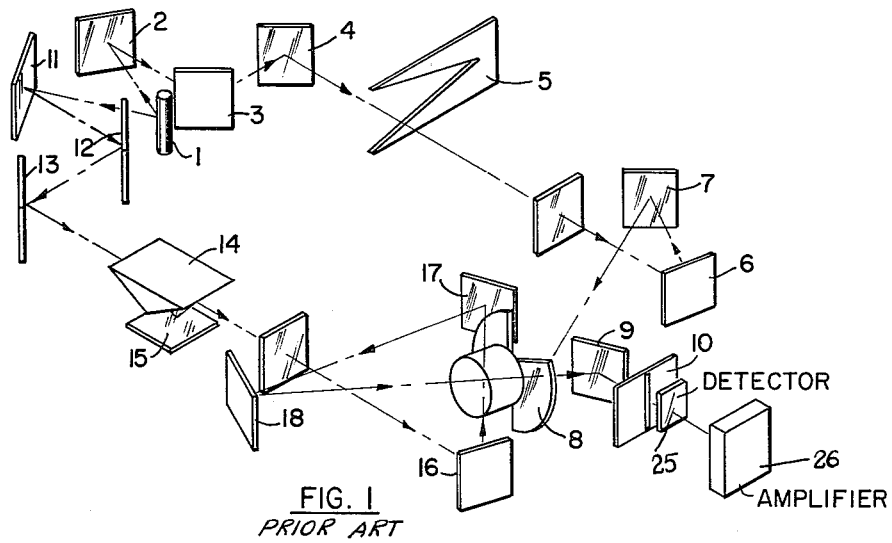
FIG. 1 is an optical diagram showing a reflectometer of the prior art.

FIG. 1 shows the optics of a standard spectrophotometer for reflectance sold by the Beckman Instrument Company. This is a double beam nulling instrument which has many advantages. It is, however, only one of numerous instruments in which the present invention can be introduced. The source of radiation is shown at 1 and may, for example, be of a suitable refractory material sold under the trademark "Globar." Radiation from the source is formed into a reference beam by converging mirror 2, plane mirrors 3 and 4 and converging mirror 6 with plane mirror 7. A beam cross-section varying device of the comb type is shown at 5. The second beam uses mirrors 11, 12, 13, 16, 17 and 18. The first five correspond to mirrors 2, 3, 4, 6 and 7 for the reference beam. The two beams are chopped by a chopper 8 which alternately passes the second beam to a plane mirror 9 and reflects the reference beam from the mirrored face of the chopper blade. The optics are so positioned that an image of the source in either beam is focused on a slit 10, behind which is shown an infrared detector 25 and A.C. amplifying and processing circuits 26. In the standard aforementioned spectrophotometer this slit is the entrance slit of a standard monochromator which is not shown as the present invention relates only to the radiation before it strikes the slit and the use which is made of the radiation thereafter is not changed by the present invention and is conventional.

The mirror system which is used in the aforementioned spectrophotometer, and which in a practical instrument is a removable attachment is inserted into the second beam between mirrors 13 and 16. It consists of a triangular glass prism 14 with two mirror faces. The beam strikes first one face, is reflected to a plane mirror 15 which in turn reflects the beam back to the other face and it then passes onto mirror 16. The mirrors are quite close to each other and result in a comparatively small increase in optical path length. If maximum precision is not required the mirror system may be introduced without any refocusing.

When the instrument is to be used the mirror 15 is a reference mirror, the instrument is connected and the radiation from the slit 10, or a particular wavelength band thereof if the instrument is to be used as spectrometer finally encounters the radiation detector 25 of conventional design. The electrical signal from this detector is processed in the A.C. amplifying circuits 26 also of conventional design. Initial calibration or nulling is effected by changing the cross-section of the first beam by means of a comb 5 until the energy in the two beams is the same. The detector will, therefore, produce no A.C. signal. The comb may be manually adjusted using a suitable indicating meter or it may be automatically adjusted by conventional servo mechanisms. In any event the instrument is adjusted to a zero A.C. signal, then the mirror 15 is removed and the sample surface inserted. The reading of the instrument is then supposed to show the reflectance of the surface. This reading may either be on a meter or, where the comb 5 is automatically actuated, by a device which produces a display proportional to comb movement.

Figure 2:
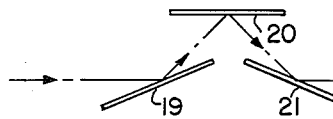
FIGS. 2 and 3 are an optical diagram before and after introduction of a sample for a simplified device.
Figure 3:
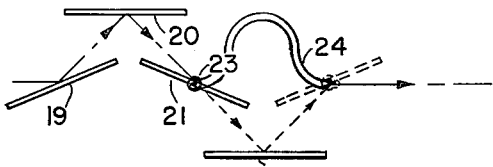

FIGS. 2 and 3 illustrate a simple form of the present invention which replaces the mirrors 14 and 15 of FIG. 1. The configuration of FIG. 2 provides two plane mirrors 19 and 21 in place of the prism 14 and another plane mirror 20 in place of the mirror 15. The passage of the light beam is shown by the arrows and the instrument is nulled or adjusted to predetermined zero indication precisely as described. Then mirror 21 is rotated 180° and at the same time this moves the mirror away from mirror 19 as will be described below so that the distance between the two is doubled. This position is shown in FIG. 3. Now a sample is inserted at 22 and the path of radiation adds the sample reflection or rather it decreases the radiation since, of course, the reflection is less than 100%. The reflections of the three mirrors remain the same and it is, therefore, immaterial what their reflections actually are. The radiation output will represent the absorption of the sample and this will be given completely accurately regardless of the nature of the mirrors 19, 20 and 21 and regardless of the other factors of the environment such as temperature or wavelength of radiations selected if a monochromator is used. Of course, the temperature must not change during the actual measurement because then the energy from the mirrors 19, 20 and 21 would also change. However, this is not a problem because temperature changes do not happen that suddenly and it will be recalled that the instrument is nulled or calibrated immediately before the reading from the sample is taken.

Only one precaution is needed in the infrared and that is that the sample surface should be at approximately the temperature of the instrument otherwise the self-emission of the sample itself due to the difference in temperature from the mirrors will introduce an error. This error is no greater than in the reflectometer previously used but it does require this reasonable precaution. The sample can be introduced into the instrument for sometime before its reflectivity is read if there is any question that it is not at the same temperature as the instrument mirrors. Calibrating, nulling or other measurements such as transmission measurements of the instrument proceed exactly as if the sample were not there since in the position shown in FIG. 2 it is out of the light beam.

The modification shown in FIGS. 2 and 3 while very simple and cheap does require that the light beam passing through it be collimated otherwise the change in light path length when shifted from the configuration of FIG. 2 to that of FIG. 3 will change the image if converging or diverging light is passing through the instrument. As illustrated in FIGS. 2 and 3 the path length is doubled. It should be noted that the problem of path length change is also encountered in the aforementioned spectrophotometer which does not use collimated light beams. However, when that instrument is used with the reflectance attachment or if it is built as a reflectometer only refocusing by adjustment of any of the mirrors in the beam path can be effected and this, of course, will remain during the reflectance measurements because when a sample surface is used in place of the mirror 15 this does not change the optical path length. Therefore, the simple modification of FIGS. 2 and 3 is primarily of interest in instruments where the beam passing through the reflectance system is collimated. This does not mean, of course, that such instruments may not be provided with an exit slit. However, then imaging must proceed by suitable optics between the mirror reflectance system and the slit.

It will be noted that in FIGS. 2 and 3 the invention is illustrated only in the beam in which a sample is to be measured. It is, therefore, just as useful in single beam instruments as in double beam instruments. The additional ease of nulling and other features which make a double beam instrument advantageous apply, of course, equally to the present invention. Whether a single beam instrument or a double beam instrument is to be used is dictated by the relative factors of ease of nulling and precision as opposed to the higher cost of the double beam instrument. The present invention is equally applicable without change to either type.

Figure 4:
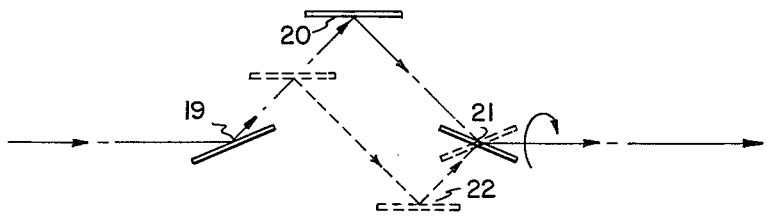
FIG. 4 is an optical diagram of a more complex device.

FIG. 4 illustrates an improved form of the present invention which is usable with instruments having convergent or divergent light beams and does not require a collimated beam. The same parts are given the same reference numerals. As in FIGS. 2 and 3 the light beam strikes the mirror 19 and is reflected therefrom to the mirror 20 then to the mirror 21 and on. For this operation the mirrors 20 and 21 are shown in full lines. A sample surface is introduced at 22 exactly as before but now if the instrument after calibration is to measure the sample reflectance the mirror 21 is rotated 180° as before to the position shown in dashed lines and the mirror 20 is moved down to a position also shown in dashed lines. From the mirror 20 to the mirror 21 the light path is also shown dashed.

As in FIGS. 2 and 3 the change in radiation is solely due to the reflective properties of sample 22 but now there is no change in path length and, therefore, the instrument may be used with any kind of light beam, collimated or uncollimated. The only disadvantage as against FIGS.

2 and 3 is that it is necessary to move both mirrors 20 and 21. They can be moved manually from one position to another but if they are interconnected this requires a slightly more complex drive than in the case of FIGS. 2 and 3 where the displacement of the mirror 21 is easily effected by the projection 23 which moves in a groove 24 on the shaft which turns the mirror. The mirror, therefore, both rotates and moves and this is a somewhat simpler mechanical connection than that required in FIG. 4. The difference in cost and complexity between the two alternative forms is, however, very small and, therefore, the modification of FIG. 4 is normally found to be preferable as the advantages of constant light path are usually much greater than the slight increase in cost of adjusting means.

It will be noted that the spacing between mirrors in FIG. 4 is somewhat greater than is the case in FIG. 1. This is necessary to provide the required mirror movement. However, it may result in an increase in path length which in many instruments using converging or diverging light may require refocusing of the source on the predetermined image plane when the mirror attachment is introduced.

Two typical modifications of the present invention have been shown. In each there are three mirrors. These modifications have the advantage that the beam proceeds along the same axis. This is a very great practical advantage because it permits the present invention to be fabricated as an accessory which can be introduced into instruments which are primarily used for transmission measurements. Therefore, the three mirror set up is preferred. The invention is, however, in no sense limited thereto and where a beam which proceeds in a different direction after leaving the reflectance measurement system is not objectionable two mirror systems may be used. Of course, more than three mirrors may be employed but the added complexity will ordinarily present no advantage.

I claim:
1. In a reflectometer comprising a source of optical radiation and means for forming at least one beam therefrom the improvement which comprises
   (a) in combination and in optical alignment in at least one beam three mirrors, at least one being movable, and reflecting the beam consecutively in series to produce an output beam in a single predetermined direction,
   (b) means for supporting a surface, the reflection of which is to be measured, in the beam between the first and the last of the three mirrors, and
   (c) means for rotating the last mirror and translating it to a position to receive reflected radiation from the surface to be measured and to reflect radiation in said predetermined direction whereby there is no change in the number of reflecting surfaces except for the addition of the surface, the reflectance of which is to be measured.

2. In a reflectometer comprising a source of optical radiation and means for forming at least one beam therefrom the improvement which comprises
   (a) means for supporting a surface the reflection of which is to be measured,
   (b) an inclined mirror positioned to reflect the beam to one side, a second plane mirror positioned to reflect the reflected beam onto the surface to be measured and a third plane mirror,
   (c) means for rotating the third mirror into one of two positions the first position receiving reflected radiation from the second mirror and reflecting the radiation in the form of an output beam in a predetermined direction,
   (d) means for translating the second mirror to a position where the reflected radiation therefrom strikes the surface to be measured and is reflected therefrom onto the third mirror in its second position to form an output beam substantially coincident with the output beam when the second and third mirrors are in their first position, the total path length being the same in each position, whereby there is no change in the number of reflecting surfaces except for the addition of the surface, the reflectance of which is to be measured.

3. A reflectometer according to claim 1 in which the mirrors are positioned so that the radiation beam leaving the mirror system is substantially aligned with and in the same direction as the incoming beam striking the first of the three mirrors.

4. A reflectometer according to claim 2 in which the mirrors are positioned so that the radiation beam leaving the mirror system is substantially aligned with and in the same direction as the incoming beam striking the first of three mirrors.

References Cited in the file of this patent
FOREIGN PATENTS
947,752 Germany _____ Aug. 23, 1956

OTHER REFERENCES

Canada, abstract of application Serial No. 125,645, published August 14, 1951 in the O.G., vol. 649, pages 603–4.

Weeks, Simple Wide Range Specular Reflectometer, Journal of the Optical Society of America, vol. 48, No. 11, November 1958, pages 775, 776.